W. JASPER.
MACHINERY FOR CUTTING AND PRESSING SUGAR INTO CUBES.
No. 194,244. Patented Aug. 14, 1877.
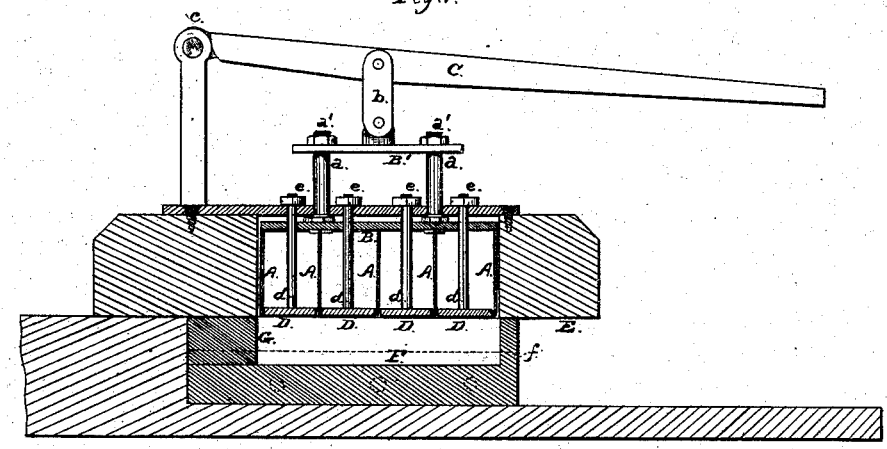
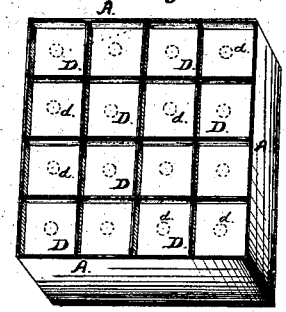
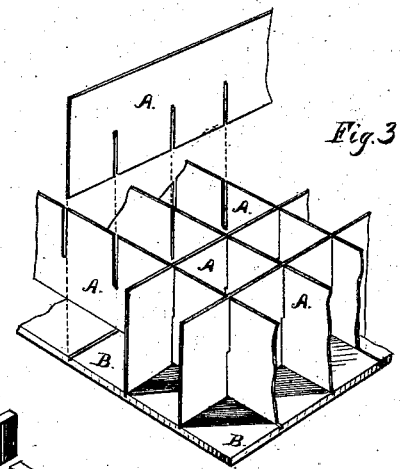
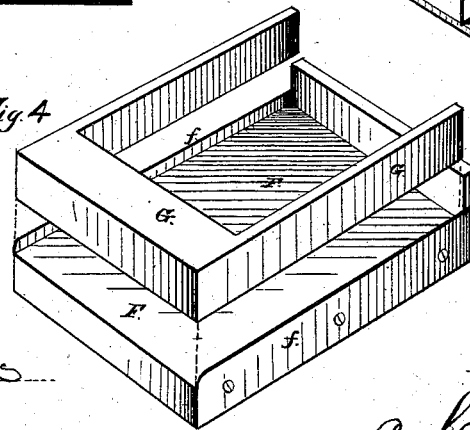
Witnesses:
Edward L. Osborn
Ed. J. Taylor
Inventor:
William Jasper
By C. W. M. Smith his Atty

UNITED STATES PATENT OFFICE.

WILLIAM JASPER, OF SAN FRANCISCO, CALIFORNIA, ASSIGNOR OF ONE-HALF HIS RIGHT TO STEPHEN BOUSHEY, OF SAME PLACE.

IMPROVEMENT IN MACHINERY FOR CUTTING AND PRESSING SUGAR INTO CUBES.

Specification forming part of Letters Patent No. 194,244, dated August 14, 1877; application filed March 8, 1877.

*To all whom it may concern:*

Be it known that I, WILLIAM JASPER, of San Francisco, in the county of San Francisco and State of California, have invented a new and useful Improvement in Machinery for Cutting and Pressing Sugar into Cubes, which improvement is set forth in the following specification and accompanying drawing.

In the said drawing, Figure 1 is an elevation in section of my improved machine and the mold used to hold the sugar. Fig. 2 is a plan view of the cutters and pressers. Fig. 3 is a detail view of the cutting-blades in perspective, showing the manner of combining them together; and Fig. 4 is a perspective view of the frame and tray forming the mold.

My invention consists in an arrangement of knives or cutters together in a rectangular form, with a series of pressers within each rectangular space, that when the cutters are pressed down into a mass of sugar in the mold the sugar will be divided and pressed into a number of solid, compact cubes by the combined action of the reciprocating cutters and the operation of the pressers.

The object of my invention is to divide and press a mass of sugar into cubes or blocks of proper size, ready for the drying process or machinery at one operation.

This I accomplish by arranging a set or gang of cutters, A A, upon a reciprocating plate or frame, B, to which a proper movement is given by means of the lever C, pivoted at $c$, and connected with the plate B' by the link $b$.

These cutters A are formed of thin metal blades or plates, intersecting and crossing each other at right angles, so as to include and form a series of rectangular spaces of the size required for the cubes to be made.

Within each space is placed a rectangular block or presser, D, which has no movement, but is held in a fixed position, with its lower face in the same plane as the bottom of the bed-plate E of the machine, so that when a mold is introduced beneath the cutters A the face of the pressers will rest upon or be in contact with the mass of sugar in the mold.

Each of these pressers D is held in a fixed manner by means of the rod $d$ and the nut $e$, that are shown in Fig. 1 of the drawing, and by means of this arrangement the pressers can be adjusted with reference to the bottom of the bed-plate E by loosening or tightening the nuts, and thus lowering or raising the presser-rods $d$ $d$.

The cutter-plate B is connected with the reciprocating plates B' by the rods $a$ $a$, made adjustable in a vertical direction by the nuts $a'$ $a'$, and the cutters have a reciprocating motion out from the machine and back again between the stationary pressers for a distance equal to the depth of the mold. One movement of the lever C down and up, therefore, forces the cutters into the mold and withdraws them again, leaving the sugar divided and pressed into a number of cubes.

The molds which are used to hold the sugar in the machine, and present it in a proper manner to the action of the cutters, are composed of a tray, F, a metal rim, $f$, and a removable frame, G, which is made of the same height as the size required for the cubes, and is held in place between the rims. This frame confines the sugar in place in the mold while receiving the pressure of the cutters, and is removed from the mold when it is drawn out from the machine, in order to allow the tray F with the cubes of sugar upon it to be brought into contact with the atmosphere of the drying room or chamber, and the moisture of the cubes to be thus more rapidly evaporated.

In the operation of my machine, the mold F, filled with sugar, is introduced beneath the cutters A in proper position, so that the outside blades of the cutters will pass down just within the frame or sides of the mold, and, upon pressure being applied to the lever C, the outside cutters and the interior ones that intersect each other at right angles will be pressed down into the mass of sugar, and divide and force its particles into the spaces formed by the cutters A and the stationary pressers D. As the cutters continue to move down through the mass, the particles of sugar that are divided by and confined within the space formed by the cutters cannot escape, but are pressed and forced against the presser D and the sides of the cutters until the edges of the cutters, having passed through the mass of sugar, are brought in contact with the bottom of the tray, when the quantity of sugar contained within each rectangular space will have the form of a cube whose sides are formed by the faces of the cutters, and the top and bottom by the presser and the bottom of the tray. The upward movement of the cutter-plate then withdraws the cutters from the mold without disturbing the form of the cubes of sugar thereon, for the pressers D over the cubes hold them intact, and act, also, as strippers to the blades of the cutters as they move upward into the machine.

It will thus be readily seen and understood that the pressers D act also as strippers to prevent any moist particles of sugar from adhering to the sides of the cutters as they move out of the mold, and thus tend to preserve the sides of the cubes straight and smooth at the same time that they hold the cubes in position while the cutters are being raised from between the cubes, and also that the cutters and pressers together act to press as well as divide the mass of moist sugar into cubes by confining and forcing its particles into the cubical space formed by the cutters and pressers as the cutter-plate is moved down into the mass of sugar.

As the parts become worn from use the cutter-plate and the pressers can be adjusted with reference to the bottom face of the bed-plate of the machine, with which they should be in line when the machine is at rest, in order to allow the mold to slide in readily beneath the machine.

Having thus fully described my invention, what I claim therein as new, and desire to secure by Letters Patent, is—

1. A machine for cutting and pressing sugar into cubes, consisting of a frame or bed, E, a series of cutters formed by cutter-blades A A crossing and intersecting each other at right angles, and reciprocated by suitable mechanism, and a set of stationary pressers, D D, held within the spaces formed on and by the cutters, constructed, arranged, and operating together substantially as described, for the purpose set forth.

2. The construction and arrangement, upon a cutter-plate, B, having a reciprocating motion imparted to it, of a set of cutters, A A, crossing and intersecting each other at right angles, and inclosing a series of rectangular spaces, within which are placed and held a set of stationary blocks or pressers, D D, the said cutters and cutter-plate and the said pressers being adjustable in a vertical direction within the machine or mechanism with which they are combined, substantially as and for the purposes described and shown.

3. A mold for holding sugar to be submitted to the action of a cutting and pressing machine, composed of a tray, F, rims $f$, and removable frame G, arranged and combined together substantially as and for the purpose described and shown.

In testimony that I claim the foregoing I have hereunto set my hand this 21st day of February, 1877.

WILLIAM JASPER.

Witnesses:
C. W. M. SMITH,
WILLIAM HARNEY.